United States Patent Office 3,560,198
Patented Feb. 2, 1971

3,560,198
SEPARATION OF MAGNESIUM AND CARBON MONOXIDE VAPORS
William A. Mod, John J. Newport III, and Oliver Osborn, Lake Jackson, Tex., assignors to The Dow Chemical Company, Midland, Mich.
No Drawing. Filed Aug. 14, 1967, Ser. No. 660,215
Int. Cl. C22b 45/00, 9/08
U.S. Cl. 75—67    6 Claims

ABSTRACT OF THE DISCLOSURE

A process for separating magnesium vapors from carbon monoxide vapors which comprises: contacting a magnesium-carbon monoxide vapor mixture maintained at a temperature of from about 1500° to about 1850° C. with a purification bed consisting of metal carbides which are characterized in that they react with carbon monoxide to form metal oxides and carbon at the indicated temperature range and furthermore, the metal carbides and metal oxides are not reduced by the magnesium vapors and do not fuse, melt or volatilize at the indicated temperature range. The metal carbides are further characterized in that they can be regenerated by heating the resultant metal oxides and carbon to a temperature greater than the separation temperature.

BACKGROUND OF THE INVENTION

Magnesium metal is formed by a number of different methods, one common method comprises reacting magnesium oxide containing ores with carbon at elevated temperatures. One difficulty inherent in the carbothermic reduction method is the problem of separating carbon monoxide and magnesium metal vapors formed in the process so as to prevent a recombination and contamination of the magnesium metal. Heretofore, the most successful method to separate carbon monoxide vapors from magnesium vapors has been to shock-cool the magnesium-carbon monoxide vapor mixture to a temperature below which the recombination of magnesium and carbon monoxide is minimized. The shock cooling processes have generally consisted in a rapid quenching of the vapor mixture using hydrogen, methane, oil sprays and other like materials. However, these methods have not found great success, both from an efficiency and from an economic standpoint. The present method allows a substantially complete separation of magnesium and carbon monoxide vapors while utilizing temperatures normally encountered in the carbothermic reduction of magnesium oxide containing ores.

SUMMARY OF THE INVENTION

The present method comprises contacting a vapor mixture of magnesium and carbon monoxide with a purification bed consisting of metal carbides at a temperature range which is about the same as that employed in the carbothermic reduction of magnesium oxide containing ores, generally about 1500° C. and higher. The metal carbides which can be employed herein are characterized in that at the temperatures characteristic of the carbothermic reduction of magnesium oxide they will react with carbon monoxide to form metal oxides and carbon, and furthermore the metal carbides and metal oxides are not reduced by the magnesium metal vapors at the indicated temperature range. Also metal carbides are chosen such that they and their corresponding metal oxides do not volatilize, melt or fuse, i.e., should remain solid, at the indicated operating temperatures. A further refinement of the novel process consists in choosing metal carbides having the characteristics as indicated hereinbefore, and also characterized in that the metal oxide formed during the separation step will readily react with the carbon produced when heated to a temperature which is slightly greater than the temperature employed in the separation step, thereby to regenerate the metal carbides. In this manner the purification bed can be regenerated and reused in the separation step.

PREFERRED EMBODIMENTS

Usually, in the practice of the present invention, a magnesium and carbon monoxide vapor mixture obtained directly from a carbothermic reduction process is conducted through a reactor chamber having a purification bed consisting of metal carbides, while said reactor chamber is maintained at a temperature of from about 1500° C. to about 1850° C. The carbon monoxide vapors react with the metal carbides to form metal oxides and carbon and the magnesium vapors are separated from the reaction chamber, condensed and usually cast into ingots.

Metal carbides are usually chosen such that the purification bed can be regenerated by subjecting the corresponding metal oxides and carbon produced to a temperature of from about 1900° to about 2200°, thus regenerating the corresponding metal carbides and liberating carbon monoxide. In this manner the purification bed can be employed indefinitely.

One scheme for practicing the invention is to provide two separation chambers connected to a reaction chamber where magnesium and carbon monoxide vapors are produced in a typical carbothermic reduction of magnesium oxide ores process. The separation chambers are each provided with a purification bed of metal carbides and each is separately connected to the reaction chamber. In this manner, one separation chamber can be used to separate magnesium vapors and carbon monoxide vapors while the other separation chamber is being regenerated as described hereinbefore, and the novel separation process can be run as a continuous operation.

It is appreciated that many variations may be employed in carrying out the novel separation process without departing from the present invention.

As indicated previously, metal carbides are selected such that at the temperature usually encountered in well known carbothermic reduction of magnesium oxide processes, approximately 1500° C. and greater, carbon monoxide vapors react with the metal carbides to form metal oxides and carbon thus separating them from the magnesium vapors. A further characteristic which is desirable is that the metal oxides and carbon formed will react at a temperature higher than the carbothermic temperature to regenerate the metal carbides.

Metal carbides which have been found to be appropriate consist of aluminum carbide ($Al_4C_3$), thorium carbide ($ThC_2$), uranium carbide ($UC_2$), lanthanum carbide ($LaC_2$), calcium carbide ($CaC_2$), strontium carbide ($SrC_2$), barium carbide ($BaC_2$), beryllium carbide ($BeC_2$) and mixtures thereof.

The metal carbide purfication bed usually consists of metal carbides in granular form, however, porous bricks and other like porous structures may be employed.

The temperature range at which carbon monoxide vapors may be separated from magnesium vapors by passing the vapors through a purificaton bed, as characterized hereinbefore, can range from about 1500° C. to about 1850° C. Preferably the separation step should be carried out at a temperature of from about 1700° C. to about 1800° C.

The regeneration temperature usually ranges from about 1900° to 2200° C. and preferably should be within the range of from about 1900° to 2000° C.

Generally, atmospheric pressure is employed, however, higher or subatmospheric pressures may also be employed.

The following examples will facilitate a better understanding of the present invention. They are included herein for illustrative purposes only and are not meant to limit the invention to the specific embodiments incorporated therein.

Example 1

A MgO-graphite powder mixture containing graphite in excess of that required for the carbothermic production of magnesium was placed in the lower section of a two-chamber graphite reactor. A graphite cloth was placed over this chamber and supported an aluminum graphite powder mixture containing excess graphite. A threaded graphite condenser tube was screwed into the top of the two-chambered graphite reactor. The whole graphite assembly was placed into a Vycor glass chamber and thermally insulated from the Vycor with acetylene black. The Vycor chamber in turn was placed in an induction heater coil heated with a 6-kilowatt Ajax converter. The Vycor chamber and graphite reactor were evacuated very slowly, backfilled with argon and placed on a slow argon purge. The graphite reactor was the susceptor. Power was turned on and the temperature increased very slowly over a one-hour period from room temperature to about 1300° C. to permit the aluminum and graphite in the upper chamber to react and form an $Al_4C_3$ purification bed. The temperature was then raised to 1700–1800° C. and held there for one hour. Temperatures were measured and readings taken with an optical pyrometer. After this reaction period, the reactor was allowed to cool under argon purge. At room temperature, the purge was discontinued. The reactor was disassembled and samples were taken of the deposits in the condenser. Samples were taken from various areas of the reactor and analyzed by X-ray diffraction. The analysis of each sample is tabulated in the following Table I.

monoxide vapors, separating said carbon monoxide vapors from said magnesium metal vapors and recovering said magnesium metal the improvement which comprises:

(a) providing a purification bed which is separate from said reaction mass consisting of at least one metal carbide, said metal carbide characterized as forming a metal oxide and carbon when contacted with carbon monoxide at an elevated temperature, and further characterized in that the metal carbide and its corresponding metal oxide is solid and substantially non-volatile at a temperature below about 1850° C.;

(b) contacting the purification bed with said carbon monoxide-magnesium vapor mixture at a temperature of from about 1500° to about 1850° C. thereby converting the carbon monoxide vapor to carbon and the metal carbide to a metal oxide; and (c) separating substantially carbon monoxide free magnesium vapors from the purification bed.

2. The process as defined in claim 1 wherein the treatment temperature ranges from about 1700° to about 1800° C.

3. The process as defined in claim 1 wherein the metal carbides are further characterized in that their metal oxides are reconverted to the metal carbides by heating in the presence of carbon to a temperature of from about 1900° to about 2200° C., and including the step of heating the purification bed, following the separation of magnesium vapors therefrom to a temperature of from about 1900° to about 2200° C. thereby to regenerate the metal carbides.

4. The process as defined in claim 3 wherein the purification bed is heated to a temperature of from about 1900° C. to about 2000° C. following the separation step.

5. The process as defined in claim 1 wherein the purification bed consists of metal carbides chosen from the group consisting of aluminum carbide ($Al_4C_3$), thorium

TABLE I

| Sample | Place sample taken | Constituents of sample |
|---|---|---|
| 1 | Metal condensed on graphite condenser | Major constituent: magnesium metal; traces: MgO, graphite and $MgAl_2O_4$. |
| 2 | Sample from top of purification bed | Major constituent: $Al_4C_3$ and $MgAl_2O_4$; minor constituent: MgO, graphite. |
| 3 | Sample from middle of purification bed | Major constituent: $Al_4C_3$; minor constituents: $MgAl_2O_4$ and graphite. |
| 4 | Sample from bottom portion of purification bed | Major constituents: $MgAl_2O_4$, graphite and $Al_4C_3$. |

Example 2

Another mixture of magnesium oxide and graphite was processed under the same procedures and conditions as described in Example 1. A deposit of metal formed on the upper condenser surface. A sample of the metal was analyzed by emission spectroscopy and showed the following: aluminum, calcium silicon and iron were present in an amount less than 0.1 percent, and magnesium was the chief constituent.

Various modifications may be made in the present novel process without departing from the spirit or scope thereof for it is understood that we limit ourselves only as defined in the appended claims.

What is claimed is:

1. In the process of preparing magnesium metal by subjecting a reaction mass comprising magnesium oxide containing ore and a carbon containing reducing agent to a temperature sufficient to reduce said magnesium oxide and form magnesium metal vapors admixed with carbon carbide ($ThC_2$), uranium carbide ($UC_2$), lanthanium carbide ($LaC_2$), calcium carbide ($CaC_2$), strontium carbide ($SrC_2$), barium carbide ($BaC_2$), beryllium carbide ($BeC_2$), and mixtures thereof.

6. The process as defined in claim 1 wherein the purification bed consists of aluminum carbide ($Al_4C_3$).

References Cited

UNITED STATES PATENTS

| 2,158,786 | 5/1939 | Kirk | 75—67 |
| 2,214,557 | 9/1940 | Kirk | 75—67 |
| 2,402,193 | 6/1946 | Willmore | 75—67 |
| 2,813,017 | 11/1957 | Mathieu | 75—67X |
| 3,427,152 | 2/1969 | Eisenberg et al. | 75—67 |

FOREIGN PATENTS

| 516,758 | 1/1940 | Great Britain | 75—67 |

HENRY W. TARRING II, Primary Examiner